(12) United States Patent
Huang et al.

(10) Patent No.: US 9,965,297 B2
(45) Date of Patent: May 8, 2018

(54) ASSISTANCE INFORMATION CONTROLLING

(75) Inventors: Xianjun Huang, Beijing (CN); Dongzhi Xia, Beijing (CN); Fan Yang, Beijing (CN); Matthew Robert Scott, Beijing (CN); Gang Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 833 days.

(21) Appl. No.: 13/426,852

(22) Filed: Mar. 22, 2012

(65) Prior Publication Data
US 2012/0245921 A1 Sep. 27, 2012

(51) Int. Cl.
G06F 17/27 (2006.01)
G06F 9/44 (2018.01)
G06F 3/0484 (2013.01)

(52) U.S. Cl.
CPC .......... G06F 9/4446 (2013.01); G06F 3/0484 (2013.01)

(58) Field of Classification Search
CPC ...... G06F 3/0482; G06F 3/048; G06F 3/0486; G06F 8/33; G06F 9/4446; G06F 9/0448; G06F 17/24; G10L 15/14
USPC ........................................................ 704/1–9
See application file for complete search history.

(56) References Cited

U.S. PATENT DOCUMENTS

| | | | |
|---|---|---|---|
| 5,390,281 A | 2/1995 | Luciw et al. | |
| 5,754,176 A * | 5/1998 | Crawford | G06F 3/04895 715/711 |
| 6,026,233 A * | 2/2000 | Shulman | G06F 8/33 715/201 |
| 6,249,606 B1 | 6/2001 | Kiraly et al. | |
| 7,100,123 B1 * | 8/2006 | Todd | G06F 17/3061 707/E17.058 |
| 7,224,989 B2 * | 5/2007 | Kraft | 455/466 |
| 7,296,230 B2 * | 11/2007 | Fukatsu | G06F 17/30873 707/E17.111 |
| 7,614,019 B2 | 11/2009 | Rimas Ribikauskas et al. | |
| 2002/0002565 A1 * | 1/2002 | Ohyama | 707/501.1 |
| 2002/0011993 A1 * | 1/2002 | Lui | G06F 3/04886 345/179 |

(Continued)

FOREIGN PATENT DOCUMENTS

| | | |
|---|---|---|
| CN | 1384447 | 12/2002 |
| CN | 1387639 | 12/2002 |

OTHER PUBLICATIONS

Halsey, Mike. "Making Windows 10 More Accessible and Easier to Use." Beginning Windows 10. Apress, 2015. 329-352.*

(Continued)

*Primary Examiner* — Olujimi Adesanya
(74) *Attorney, Agent, or Firm* — Drinker Biddle & Reath LLP (57) ABSTRACT

Controlling assistance information comprises determining a user mode based on computer input signals generated by a user. If the user is in a passive mode and assistance information is detected, the assistance information is disabled in response to detecting a hidden signal. The assistance information is then enabled if later a reset signal is detected. If the user is in passive mode and assistance information is not detected, the assistance information is enabled in response to detecting a trigger signal. If the user is in an active mode and assistance information is detected, the assistance information is disabled.

19 Claims, 3 Drawing Sheets (56) References Cited

U.S. PATENT DOCUMENTS

| | | | |
|---|---|---|---|
| 2005/0043949 A1* | 2/2005 | Roth | G10L 15/14 704/251 |
| 2005/0060138 A1* | 3/2005 | Wang et al. | 704/1 |
| 2005/0246352 A1* | 11/2005 | Moore et al. | 707/100 |
| 2006/0052885 A1* | 3/2006 | Kong | G06F 1/1626 700/84 |
| 2007/0038956 A1* | 2/2007 | Morris | G06F 3/0481 715/808 |
| 2007/0211071 A1* | 9/2007 | Slotznick | G06F 17/30899 345/594 |
| 2007/0226614 A1* | 9/2007 | Lorenzen | G06F 17/30905 715/234 |
| 2007/0244691 A1* | 10/2007 | Alwan | G06F 17/2276 704/8 |
| 2007/0260981 A1* | 11/2007 | Kim | G06F 3/04812 715/256 |
| 2007/0276650 A1* | 11/2007 | Kotipalli et al. | 704/8 |
| 2009/0132919 A1* | 5/2009 | Allen, Jr. | G06F 9/4446 715/708 |
| 2009/0183107 A1* | 7/2009 | Matthews | G06F 3/048 715/781 |
| 2010/0058227 A1 | 3/2010 | Danton et al. | |
| 2010/0100854 A1 | 4/2010 | Russell et al. | |
| 2010/0105443 A1* | 4/2010 | Vaisanen | G06F 3/0486 455/566 |
| 2010/0169770 A1* | 7/2010 | Hong et al. | 715/261 |
| 2010/0235730 A1* | 9/2010 | Campbell | G06F 17/24 715/256 |
| 2010/0292984 A1* | 11/2010 | Huang et al. | 704/9 |
| 2010/0315266 A1 | 12/2010 | Gunawardana et al. | |
| 2010/0318743 A1* | 12/2010 | Fitzpatrick | G06F 9/4448 711/126 |
| 2011/0209047 A1* | 8/2011 | Olsen | G06F 9/4448 715/234 |

OTHER PUBLICATIONS

Landay et al, "Extending an Existing User Interface Toolkit to Support Gesture Recognition", Proc 1993 Interact 1993 and CHI 1993 conf companion on Human Factors in computing systems, Apr. 1993, 2 pgs.

The Chinese Office Action dated Jan. 23, 2017 for Chinese Patent Application No. 201110081375.1, a counterpart foreign application of U.S. Appl. No. 13/426,852.

Translated Chinese Office Action dated May 5, 2016 for Chinese Patent Application No. 201110081375.1, a counterpart foreign application of U.S. Appl. No. 13/426,852, 12 pages.

* cited by examiner

ASSISTANCE INFORMATION CONTROLLING

CROSS REFERENCE TO RELATED PATENT APPLICATIONS

This application claims priority to Chinese Patent Application No. 201110081375.1, filed on Mar. 24, 2011, entitled "METHOD AND APPARATUS FOR CONTROLLING ASSISTANCE INFORMATION," which is hereby incorporated by reference in its entirety.

FIELD OF THE INVENTION

This disclosure relates to the field of computer assistant technology. More particularly, this disclosure relates to methods and devices for controlling assistance information.

BACKGROUND

Language is a main communication tool of human beings. More and more communications occur between different languages in globalization. In our daily life, it is common to read articles, reports or papers written in foreign languages. Though some people have learned foreign languages, it is still common for them, as non-native speakers, to encounter unfamiliar words or phrases, especially while reading technical articles in the foreign languages.

Electronic documents (e.g., electronic books and articles) can be displayed on personal computers and portable electronic devices. These electronic documents are prevailing and replacing paper documents. By using electronic documents, a user can easily switch between two tasks including reading and writing, or to perform both tasks at a same time. Electronic documents also have advantages in reading articles in foreign languages. For example, when a user is reading, translation applications may provide real-time translation assistance. These translation applications, however, may present problems, for example, when they are configured to automatically translate contents of electronic documents.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure provides methods and devices for controlling assistance information. In some aspects, a method for controlling assistance information may comprise determining a mode of a user based on a computer signal that is generated by the user. If the mode is a passive mode and assistance information is disabled, the assistance information is enabled after a trigger signal is detected. If the mode is a passive mode and the assistance information is enabled, the assistance information is disabled after a hidden signal is detected. The assistance information is then enabled if a reset single is detected. If the mode is an active mode and the assistance information is enabled, the assistance information is then disabled.

BRIEF DESCRIPTION OF THE DRAWINGS

The Detailed Description is described with reference to the accompanying figures. The use of the same reference numbers in different figures indicates similar or identical items.

DETAILED DESCRIPTION

As discussed above, translation applications can provide real-time translation assistance information. To provide the information, the translation applications may track a movement of a mouse. For example, if a mouse stops and hovers on a certain position, a translation application analyzes a content that is displayed on a main interface and corresponds to the certain position. If the content is a word, the translation application may enable assistance information (e.g., translations of the word). For instance, the content is a word or words of an article in English, the application may open a window showing Chinese translations of the word.

This automatic translation sometime may present problems. For example, a translation application initiates an automatic translation and presents assistant information when detecting a mouse stopping and hovering on a certain position corresponding to a word. Sometimes, the user, however, may not need a translation even though the mouse is hovering on the word. Therefore, a popup window with assistance message may interfere with the user's work.

This disclosure describes various exemplary ways of controlling assistance information, for example, accurate determining a user's status, timely providing assistance in demand, and removing the unnecessary assistance, therefore improving user experience.

In some embodiments, a status of a user may be categorized into two modes: a passive mode and an active mode. For example, in the passive mode, the user mainly receives information from a main interface of the computer (e.g., reading). In this mode, the user takes few operations and desires to obtain information as much as possible. If a user is in the passive mode, he or she may desire to get assistance information. On the other side, in the active mode, the user works actively (e.g., writing). In this mode, the user focuses on content that has been displayed in the main interface and may not want to be disturbed by an unexpected event (e.g., a popup window). If a user is in the active mode, the assistance information shall be avoided.

This disclosure provides various measures to determine, based on computer signals generated by a user, whether the user is in a passive mode or an active mode. The signals may include keyboard inputted signals and mouse inputted signals. In some embodiments, some signals may indicate that a user is in a passive mode. The signals may include the inputted mouse signal that indicates a linear movement and a lack of keyboard signal inputted, the inputted keyboard signal that indicates a keyboard operation of an arrow key or pageup/pagedown key and a lack of mouse signal inputted, and the inputted keyboard signal that indicates a keyboard operation of an arrow key or pageup/pagedown key and an inputted mouse signal that indicates a mouse operation of scroll bar.

For example, a user may be determined to be in a passive mode if the user is reading. When a user is reading, the user may use a mouse as a main device, and moves the mouse horizontally or vertically without keyboard operations. Alternatively, the user may use a keyboard as the main device, and arrow keys or pageup/pagedown keys are used to move a cursor without mouse operations except for operations involving a scroll bar of the mouse.

In some embodiments, some signals may indicate that a user is in a passive mode. The signals may include an input keyboard signal that indicates high density keyboard operations with periodically space bar operations and a lack of mouse signal inputted. For example, a user may be determined to be in an active mode if the user is writing. When a user is writing, the user may types a keyboard with high density, may types a space bar periodically, and may not use a mouse. No matter of which languages the user is typing, one of the most frequently used key of a keyboard is the "space bar." When the user is writing with confidence, the user will keep typing with periodically space bar inputs, and the "backspace" or "delete" is not often used. In such a situation, no language assistance is needed.

When a user is in a passive mode, the user may desire to have some assistance information. To improve user experience, the assistance information may be provided when a user needs it. Thus, a deep analysis on user operations is needed so as to extract the user intent therefrom. In some embodiments, signals may indicate that a user desires to obtain assistance information. By way of example and not limitation, the signals may include mouse operations of mouse hovering, for a period of time, on a certain position corresponding to a word, indicating that the user may not understand this word and therefore need the assistance information. The signals may also include mouse operations of moving horizontally over a position that corresponds to a word or a phrase, indicating that the user may doubt about the word or the phrase and is trying to understand this word by reading a related context repeatedly. The signals may also include mouse operations of double clicking a certain position, indicating that the user may encounter some problem in reading content corresponding to the position. The "double click" may be a habitual operation, although "double clicking" a position in the main interface might not get any response.

In some instances, when the assistance information appears in the main interface, a user may want to hide the assistance information because, for example, this information may interfere with the user's work. In some embodiments, signals may indicate that a user wants to disable the assistance information. The signals may include a mouse operation of shaking a mouse. Shake the mouse is a habitual operation indicating that the user the user wants to remove or hide this content.

In some embodiments, while a user is reading (i.e., in a passive mode), the user may focus on a certain part of content displayed in the main interface and desire not to be disturbed by assistance information. On the other hand, while a user is writing (i.e., in an active mode), the user may desire the assistance information. In these situations, an accurate response may be provided by analyzing indications of the user.

In some embodiments, a user may have hidden assistance information by shaking the mouse; but after a period of time, the user needs this assistance information. In some embodiments, signals may indicate that the use desires to re-enable the assistance information. The signals may include mouse operations of shaking a mouse, and/or certain function keys. For most of the users, they may shake the mouse again after hiding the assistance information. For some skilled users, they may take some additional keyboard operations to indicate their intent clearly. For example, they may press the "Shift" key or the "Ctrl" key while shaking the mouse, or they may press the "Shift" key or the "Ctrl" key individually, or press them in combination.

Figure 1:
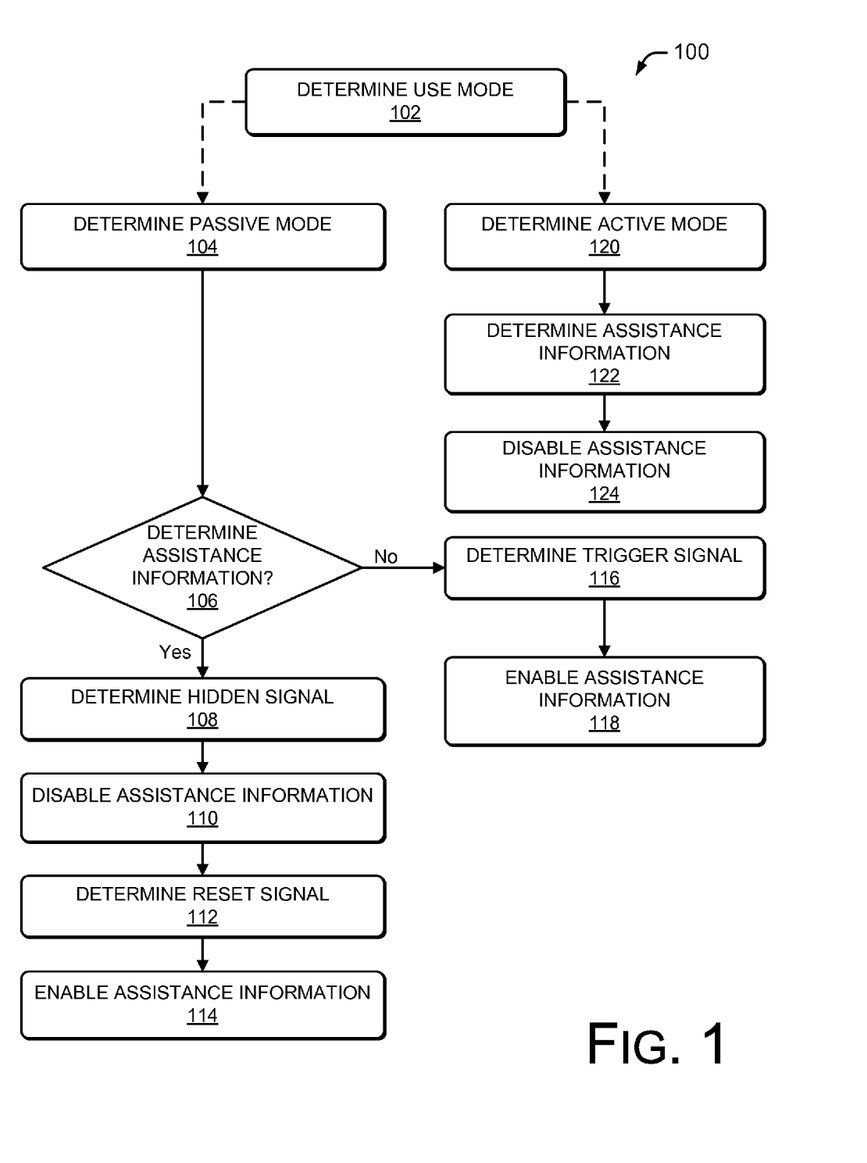
FIG. 1 is a flowchart showing an exemplary process of controlling assistance information.

FIG. 1 is a flowchart showing an exemplary process 100 of controlling assistance information. The process 100 includes operation 102, which represents determining a user mode. In some embodiments, a use mode may include a passive mode or an active mode. The user mode may be determined based on computer signals. The computer signals may include a mouse signal and a keyboard signal that are generated by the user. The passive mode may include a reviewing mode indicating that the user is reviewing or reading content displayed in a main interface. The active mode may include an inputting mode indicating that the user is inputting content that is to be displayed in the main interface.

Based on computer input signals generated by the user, operation 104 determines that the user is in the passive mode. In some embodiments, the user may be determined to be in the passive mode if the inputted mouse signal is a linear mouse movement and no keyboard signal is inputted; the inputted keyboard signal is generated from operations of arrow keys or pageup/pagedown keys and no inputted mouse signal is generated; or the inputted keyboard signal is generated from operations of arrow keys or pageup/pagedown keys and the inputted mouse signal is generated from operations of a scroll bar.

If the user is in the passive mode, operation 106 may determine whether the assistance information is enabled. If at least one window associated with the assistance information has been enabled (i.e., the "Yes" branch from the operation 106), operation 108 determines that a hidden signal is detected. In response to determination that the hidden signal is detected, operation 110 disables the enabled window. In some embodiments, the hidden signal may be determined based on a mouse signal and a keyboard signal that are generated by the user. The hidden signal may include computer signals generated from a mouse operation of shaking the mouse.

If the user is in the passive mode, a hidden signal had been detected and a window had been disabled, operation 112 determines whether a reset signal is detected. In response to determination that the reset signal is detected, operation 114 enables the window associated with the assistance information. In some embodiments, the reset signal may be determined based on a mouse signal and a keyboard signal that are generated by the user. The reset signal may include computer signal generated from mouse operations of shaking the mouse again after a hidden signal is detected, or generated from keyboard operations of particular functional keys, for example, typing the "Shift" key or the "Ctrl" key while shaking the mouse, or typing "Shift" key or the "Ctrl" key individually or together.

If the user is in the passive mode and no window associated with the assistance information has been enabled (i.e., the "No" branch of the operation 106), operation 116 determines that a trigger signal is detected. In response to determination that the trigger signal is detected, operation 118 enables a window associated with the assistance information. In some embodiments, the trigger signal may be determined based on a mouse signal and a keyboard signal that are generated by the user. The trigger signal may include computer signals generated from a mouse operation of hovering the mouse on a particular position for a period of time, the particular position being corresponding to content displayed in a main interface, of a mouse horizontal movement over a particular position corresponding to the content, or of a double click on a particular position corresponding to the content. In some embodiments, the content may include a word or a phrase in a language, and the assistance information may include information in another language.

Based on computer input signals generated by the user, operation 120 may determine that the user is in the active mode. If operation 122 determines that at least one window associated the assistance information has been enabled, operation 124 disable the enabled window. In some embodiments, the user may be determined to be in the active mode if the input keyboard signal is high density keyboard input with periodically space bar inputs and no mouse signal is inputted.

Figure 2:
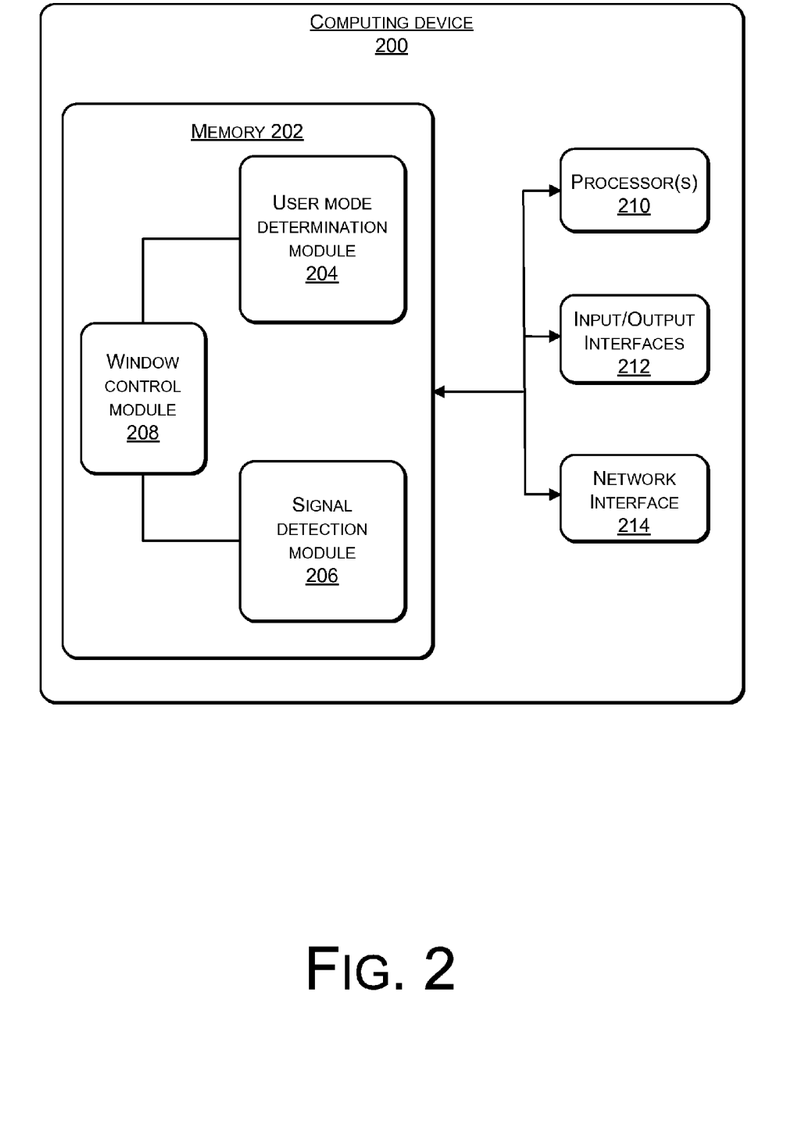
FIG. 2 is a schematic block diagram showing details of an exemplary computing device for controlling assistance information.

FIG. 2 is a schematic block diagram showing details of an exemplary computing device 200 for controlling assistance information. The computing device 200 may be configured as any suitable device. In one exemplary configuration, the computing device 200 includes one or more processors 210, input/output interfaces 212, network interface 214, and memory 202.

The memory 202 may include computer-readable media in the form of volatile memory, such as random-access memory (RAM) and/or non-volatile memory, such as read only memory (ROM) or flash RAM. The memory 202 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 202 in more detail, the memory 202 may store a user mode determination module 204, and a signal detection module 206, and a window control module 208.

The user mode determination module 204 may determine whether a user is in a passive mode or an active mode based on a mouse signal and a keyboard signal inputted by the user. For example, the passive mode may include a reviewing mode indicating that the user reviews or reads the contents displayed in the main interface. On the other hand, the active mode may include an inputting mode indicating that the user inputs contents that is to be displayed in the main interface. In some embodiments, the user mode determination module 204 determines that the user is in the passive mode if the inputted mouse signal is a linear mouse movement and no keyboard signal is inputted; the inputted keyboard signal is generated from operations of arrow keys or pageup/pagedown keys and no mouse signal is inputted; or the inputted keyboard signal is generated from operations of arrow key or pageup/pagedown key and the inputted mouse signal is operations of a scroll bar. The user mode determination module 204 may determine that the user is in the active mode if the input keyboard signal is a high density keyboard input with periodically space bar inputs and no mouse signal is inputted.

The signal detection module 206 may detect signals including a trigger signal, a hidden signal and a reset signal based on a mouse signal and a keyboard signal inputted by the user. In some embodiments, the trigger signal may include computer signals generated from a mouse operation of hovering the mouse on a particular position for a period of time, the particular position being corresponding to content displayed in a main interface, of a mouse horizontal movement over a particular position corresponding to the content, or of a double click on a particular position corresponding to the content. The hidden signal may include computer signals generated from a mouse operation of shaking the mouse. The reset signal may include computer signal generated from mouse operations of shaking the mouse again after a hidden signal is detected, and from keyboard operations of particular functional keys, for example, typing the "Shift" key or the "Ctrl" key while shaking the mouse, or typing "Shift" key or the "Ctrl" key individually or together. In some embodiments, the content may include a word or a phrase in a language, and the assistance information may include information in another language.

The window control module 208 may be connected with the user mode determination module 204 and the signal detection module 206. The window control module 206 may enable or disable a window based on a mode determined by the user mode determination module 204 and a signal detected by the signal detection module 206. If the user is in the passive mode and no window has been enabled, the window control module 208 enables a window when the trigger signal is detected. If the user is in the passive mode and at least one window has been enabled, the window control module 208 disables the enabled window when the hidden signal is detected. If the user is in the passive mode and a hidden signal had been detected and a window had been disabled, the window control module 208 enables the window again when the reset signal is detected. If the user is in the active mode and at least one window has been enabled, the window control module 208 disables the enabled window.

Figure 3:
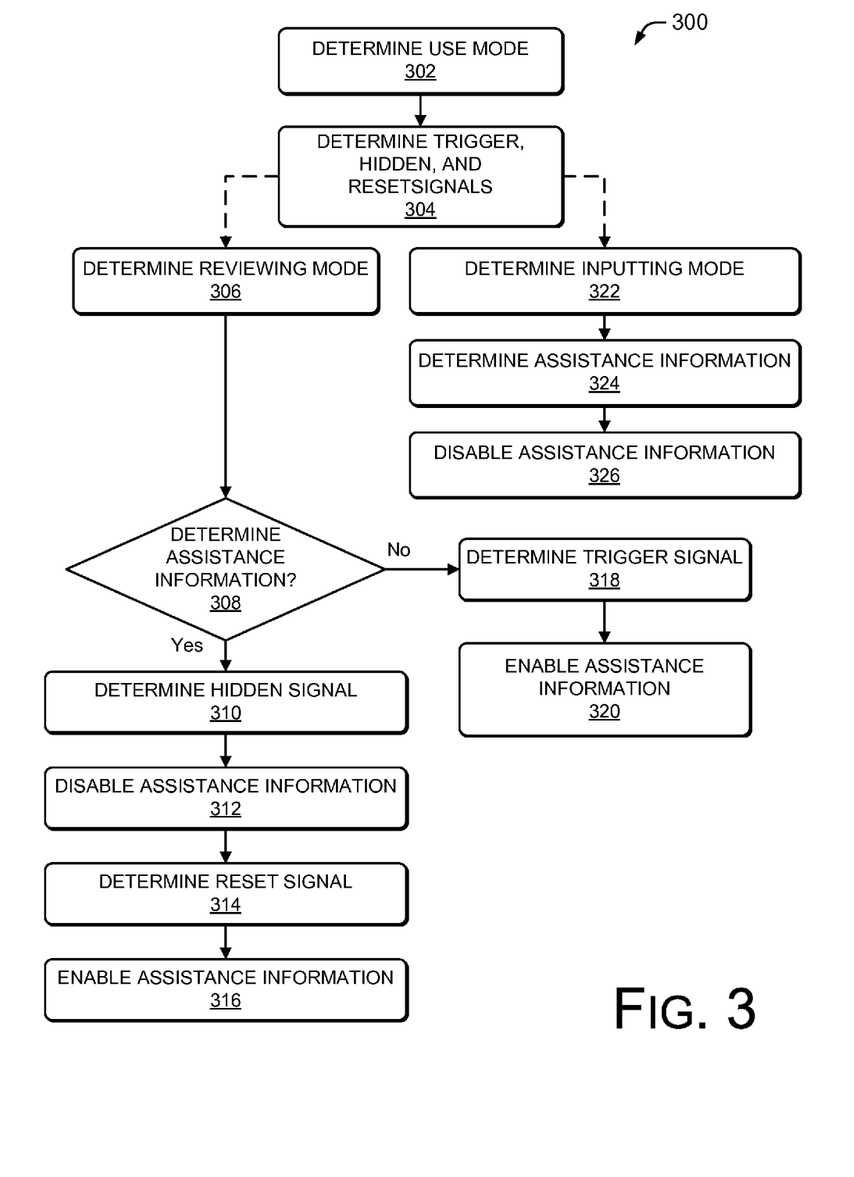
FIG. 3 is a flowchart showing another exemplary process of controlling assistance information.

FIG. 3 is a flowchart showing an exemplary process 300 of controlling assistance information. Process 300 includes operation 302, which represents determining a use mode. The user mode may include a reviewing mode or an inputting mode. The reviewing mode indicates that the user is reviewing or reading content displayed in a main interface. The inputting mode indicating that the user is inputting content that is to be displayed in the main interface. The user mode may be determined based on computer signals. The computer signals may include a mouse signal and a keyboard signal that are generated by the user.

Operation 304 detects a trigger signal, a hidden signal, and a reset signal based on computer input signals generated by the user. In some embodiments, the trigger signal may include computer signals generated from a mouse operation of hovering the mouse on a particular position for a period of time, the particular position being corresponding to content displayed in a main interface, of a mouse horizontal movement over a particular position corresponding to the content, or of a double click on a particular position corresponding to the content. The hidden signal may include computer signals generated from a mouse operation of shaking the mouse. The reset signal may include computer signal generated from mouse operations of shaking the mouse again after a hidden signal is detected, or generated from keyboard operations of particular functional keys, for example, typing the "Shift" key or the "Ctrl" key while shaking the mouse, or typing "Shift" key or the "Ctrl" key individually or together. In some embodiments, the content may include a word or a phrase in a language, and the assistance information may include information in another language.

Based on computer input signals generated by the user, operation 306 may determine that the user is in a reviewing mode. In some embodiments, the user may be determined to be in the reviewing mode if the inputted mouse signal is a linear mouse movement and no keyboard signal is inputted; the inputted keyboard signal is generated from operations of arrow keys or pageup/pagedown keys and no inputted mouse signal is generated; or the inputted keyboard signal is generated from operations of arrow keys or pageup/pagedown keys and the inputted mouse signal is generated from operations of a scroll bar.

If the user is in the passive mode, operation 308 may determine whether the assistance information is enabled. If at least one window associate with the assistance information has been enabled (i.e., the "Yes" branch from the operation 308), operation 310 determines that a hidden signal is detected. In response to determination that the hidden signal is detected, operation 312 disables the enabled window. In some embodiments, the hidden signal may be determined based on a mouse signal and a keyboard signal that are generated by the user. The hidden signal may include computer signals generated from a mouse operation of shaking the mouse.

If the user is in the passive mode, a hidden signal had been detected and a window had been disabled, operation 314 determines that a reset signal is detected. In response to determination that the reset signal is detected, operation 316 enables the window associated with the assistance information. In some embodiments, the reset signal may be determined based on a mouse signal and a keyboard signal that are generated by the user. The reset signal may include computer signal generated from mouse operations of shaking the mouse again after a hidden signal is detected, or generated from keyboard operations of particular functional keys, for example, typing the "Shift" key or the "Ctrl" key while shaking the mouse, or typing "Shift" key or the "Ctrl" key individually or together.

If the user is in the passive mode and no window associated with the assistance information has been enabled (i.e., the "No" branch of the operation 306), operation 318 determines that a trigger signal is detected. In response to determination that the trigger signal is detected, operation 320 enables a window associated with the assistance information. In some embodiments, the trigger signal may be determined based on a mouse signal and a keyboard signal that are generated by the user. The trigger signal may include computer signals generated from a mouse operation of hovering the mouse on a particular position for a period of time, the particular position being corresponding to content displayed in a main interface, of a mouse horizontal movement over a particular position corresponding to the content, or of a double click on a particular position corresponding to the content. In some embodiments, the content may include a word or a phrase in a language, and the assistance information may include information in another language.

Based on computer input signals generated by the user, operation 322 may determines that the user is in the active mode. If operation 324 determines that at least one window associated the assistance information has been enabled, operation 326 disable the enabled window. In some embodiments, the user may be determined to be in the active mode if the input keyboard signal is high density keyboard input with periodically space bar inputs and no mouse signal is inputted.

The methods and devices for controlling assistance information described in this disclosure analyze user inputs comprehensively and provide an accurate prediction of whether users need assistance or not, accordingly enabling or disabling the assistance information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable media encoded with instructions that, when executed by a processor of a computing device, cause the processor to perform acts comprising:
   displaying content of an electronic document on a display associated with the computing device;
   processing a computer signal received from an input device associated with the computing device to determine whether the computing device is in a reviewing mode in which the content is being reviewed or in an input mode in which the content or additional content is being input, the input device comprising at least one of a mouse or a keyboard, the reviewing mode being determined when at least one of:
   the computer signal indicates a linear movement of the input device,
   the computer signal indicates a keyboard operation of at least one of an arrow key, a pageup key or a pagedown key, or
   the computer signal indicates a scroll;
   detecting another computer signal from the input device or another input device associated with the computing device;
   determining that the other computer signal corresponds to a type of input associated with displaying assistance information;
   in the event that the computing device is in the reviewing mode and based at least in part on determining that the other computer signal corresponds to the type of input associated with displaying assistance information, causing the assistance information to be displayed for the content to help a user of the computing device input the content;
   in the event that the computing device is in the reviewing mode and the assistance information being presented on the display:
     determining input of a particular key of the keyboard is received in combination with input of a shaking of an input device; and
     in response to determining input of the particular key of the keyboard is received in combination with input of the shaking of the input device, removing the assistance information being presented on the display device; and
   in the event that the computing device is in the input mode and based at least in part on determining that the other computer signal corresponds to the type of input associated with displaying assistance information, preventing the assistance information from being displayed.

2. The one or more computer-readable media of claim 1, wherein:
the computer signal corresponds to an operation with content in the electronic document, the content being in a first language;
the assistance information includes information in a second language different than the first language;
the input mode is determined based at least in part on the computer signal indicating at least one of:
an operation of the input device comprising a continuous keyboard operation; or
periodic keyboard operations from a space bar.

3. The one or more computer-readable media of claim 1, wherein the computing device is associated with a keyboard, and the operations further comprising, in the event that the computing device is in the reviewing mode, determining that more space bar key inputs are received from the keyboard over a period of time than backspace key inputs or delete key inputs from the keyboard.

4. The one or more computer-readable media of claim 1, wherein the input mode is determined when at least one of:
the computer signal indicates a continuous keyboard operation; or
the computer signal indicates periodic keyboard operations from a space bar.

5. The one or more computer-readable media of claim 1, the acts further comprising, in the event that the computing device is in the input mode:
receiving a trigger signal, wherein the trigger signal indicates at least one of:
a mouse operation of hovering, for a pre-determined time period, a mouse on the content on the display;
a mouse operation of a horizontal movement over the content; or
a mouse operation of a double click on the content; and
based at least in part on receiving the trigger signal, switching from the input mode to the reviewing mode.

6. A computing device comprising:
memory;
one or more processors coupled to the memory;
a user mode determination module, stored in the memory and executable by the one or more processors, configured to determine whether a mode of a client running on the computing device is a passive mode or an active mode based on a signal received from an input device associated with the computing device;
a signal detection module, stored in the memory and executable by the one or more processors, configured to:
detect a trigger signal, and
detect a hidden signal indicating a shaking of an input device; and
a window control module, stored in the memory and executable by the one or more processors, configured to:
in response to determining that the mode is the passive mode:
disable a window after the hidden signal is detected, the window showing assistance information when the window is enabled in an interface, and
enable the window after the trigger signal is detected when the window is not enabled;
in response to determining that the mode is the active mode,
determine that a window is enabled in the interface, the window showing assistance information, and
disable the window showing the assistance information based at least in part on determining that more space bar key inputs are received than backspace key inputs or delete key inputs over a period of time.

7. The computing device of claim 6, wherein the passive mode comprises a reviewing mode indicating that the user reviews a content displayed in the interface, and the active mode comprises an inputting mode indicating that the user inputs information displayed in the interface.

8. The computing device of claim 7, wherein the passive mode is determined based on at least one of:
the signal indicating a mouse operation of a linear movement;
the signal indicating a keyboard operation of an arrow key, a pageup key or a pagedown key; or
the signal indicating a mouse operation of a scroll bar and the keyboard operation.

9. The computing device of claim 7, wherein the detecting the trigger signal is detected based on at least one of:
the signal indicating a mouse operation of hovering, during a pre-determined time period, a mouse on content displayed in the interface;
the signal indicating a mouse operation of a horizontal movement over the content; or
the signal indicating a mouse operation of a double click on the content.

10. The computing device of claim 9, wherein the content comprises a word in a language and the assistance information comprises corresponding information in another language.

11. The computing device of claim 7, wherein the signal detection module is further configured to detect a reset signal, the window control module enables the window after the reset signal is detected.

12. The computing device of claim 11, wherein the reset signal is detected based on at least one of the signal of a mouse operation of shaking a mouse, or a keyboard signal of a keyboard operation of a pre-determined key.

13. The computing device of claim 7, wherein the active mode is determined based on at least one of:
the signal indicating a continuous keyboard operation; or
the signal indicating periodic keyboard operations from a space bar.

14. A system comprising:
one or more processors;
a display; and
computer-readable media storing instructions that, when executed by the one or more processors, cause the one or more processors to perform operations comprising:
causing the display to present content;
receiving a first signal from a first input device;
determining, based at least in part on the first signal, whether the system is operating in a reviewing mode in which the content is being reviewed or in an input mode in which the content or additional content is being input;
receiving a second signal from the first input device or a second input device;
determining that the second signal corresponds to a type of input associated with displaying assistance information;
in the event that the system is in the reviewing mode and based at least in part on determining that the second signal corresponds to a type of input associated with displaying assistance information, causing the assistance information to be presented on the display for the content to help a user input the content;

in the event that the system is in the reviewing mode and the assistance information being presented on the display:

determining input of a particular key of one of both of the first input device or the second input device is received in combination with input of a shaking of one of both of the first input device or the second input device; and in response to determining input of the particular key of one of both of the first input device or the second input device is received in combination with input of the shaking of the one of both of the first input device or the second input device, removing the assistance information being presented on the display device; and in the event that the system is in the input mode and based at least in part on determining that the second signal corresponds to a type of input associated with displaying assistance information, preventing the assistance information from being displayed on the display.

15. The system of claim 14, the determining whether the system is operating in the reviewing mode or the input mode comprises determining that the system is in the reviewing mode, the reviewing mode being determined when at least one of:

the first signal indicates a linear movement of the first input device;

the first signal indicates a keyboard operation of at least one of an arrow key, a pageup key, or a pagedown key; or the first signal indicates a scroll.

16. The system of claim 14, the determining whether the system is operating in the reviewing mode or the input mode comprises determining that the system is in the input mode, the input mode being determined when at least one of:

the first signal indicates a continuous keyboard operation; or the first signal indicates periodic keyboard operations from a space bar.

17. The system of claim 14, wherein:

the first signal corresponds to an operation with the content in the system, the content being in a first language; and the assistance information includes information in a second language different than the first language.

18. The system of claim 14, wherein the first input device includes a keyboard, and the operations further comprising, in the event that the system is in the reviewing mode, determining that more space bar key inputs are received from the keyboard over a period of time than backspace key inputs or delete key inputs from the keyboard.

19. The system of claim 14, wherein the system is associated with a keyboard and a mouse, wherein one of the first input device or the second input device is the mouse and the other one of the first input device or the second input device is the keyboard, and wherein in the event that the system is in the reviewing mode and the assistance information being presented on the display, determining input of the shaking of the one of both of the first input device or the second input device further includes:

determining input of the particular key of the keyboard is received in combination with input of a shaking the mouse; and in response to determining input of the particular key of the keyboard is received in combination with input of the shaking the mouse, removing the assistance information being presented on the display.

\* \* \* \* \*